(12) United States Patent
Siegel

(10) Patent No.: US 6,904,280 B2
(45) Date of Patent: Jun. 7, 2005

(54) COMMUNICATION SYSTEM WITH MOBILE COVERAGE AREA

(75) Inventor: Neil G. Siegel, Rancho Palos Verdes, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 15 days.

(21) Appl. No.: 10/295,623

(22) Filed: Nov. 14, 2002

(65) Prior Publication Data

US 2004/0097227 A1 May 20, 2004

(51) Int. Cl.[7] .................................................. H04Q 7/20
(52) U.S. Cl. ...................... 455/431; 455/422; 455/428; 356/141.4
(58) Field of Search ................................ 455/431, 422, 455/524, 436, 11.1, 13.1, 456, 38.1, 33.2, 428, 427; 356/141.4; 348/207.1; 340/573.1

(56) References Cited

U.S. PATENT DOCUMENTS

| | | | |
|---|---|---|---|
| 4,578,815 A | | 3/1986 | Persinotti |
| 5,163,158 A | * | 11/1992 | Tendler et al. .............. 455/11.1 |
| 5,404,570 A | * | 4/1995 | Charas et al. ................. 455/22 |
| 5,519,761 A | * | 5/1996 | Gilhousen ................... 455/431 |
| 5,559,865 A | * | 9/1996 | Gilhousen ................... 455/431 |
| 5,603,080 A | * | 2/1997 | Kallander et al. ............ 455/14 |
| 5,864,481 A | | 1/1999 | Gross et al. |
| 6,011,510 A | | 1/2000 | Yee et al. |
| 6,016,318 A | * | 1/2000 | Tomoike .................... 370/401 |
| 6,111,860 A | | 8/2000 | Braun |
| 6,119,179 A | | 9/2000 | Whitridge et al. |
| 6,212,559 B1 | | 4/2001 | Bixler et al. |
| 6,243,575 B1 | * | 6/2001 | Ohyama et al. .......... 455/456.4 |
| 6,259,691 B1 | | 7/2001 | Naudus |
| 6,269,243 B1 | * | 7/2001 | Corbefin et al. ............ 455/431 |
| 6,281,970 B1 | * | 8/2001 | Williams et al. ......... 356/141.4 |
| 6,285,757 B1 | * | 9/2001 | Carroll et al. .............. 345/619 |
| 6,298,062 B1 | | 10/2001 | Gardell et al. |
| 6,311,128 B1 | | 10/2001 | Prum et al. |
| 6,321,095 B1 | | 11/2001 | Gavette |
| 6,324,398 B1 | * | 11/2001 | Lanzerotti et al. .......... 455/431 |
| 6,327,267 B1 | | 12/2001 | Valentine et al. |
| 6,330,316 B1 | | 12/2001 | Donak et al. |
| 6,529,486 B1 | * | 3/2003 | Barnes et al. ................ 370/327 |
| 2002/0022452 A1 | * | 2/2002 | Toya .......................... 455/13.1 |
| 2002/0097157 A1 | * | 7/2002 | Piri et al. .................. 340/573.1 |
| 2002/0147661 A1 | * | 10/2002 | Hatakama et al. ............ 705/26 |
| 2002/0154221 A1 | * | 10/2002 | Ishimaru ................... 348/207.1 |
| 2003/0073447 A1 | * | 4/2003 | Ogaki et al. ................. 455/456 |
| 2003/0078054 A1 | * | 4/2003 | Okuda ........................ 455/456 |
| 2003/0087648 A1 | * | 5/2003 | Mezhvinsky et al. ........ 455/456 |
| 2003/0117494 A1 | * | 6/2003 | Poblete ........................ 348/148 |
| 2003/0169335 A1 | * | 9/2003 | Monroe ....................... 348/143 |

* cited by examiner

Primary Examiner—Nick Corsaro
Assistant Examiner—Tan Trinh
(74) Attorney, Agent, or Firm—Tarolli, Sundheim, Covell & Tummino L.L.P.

(57) ABSTRACT

Systems and methods are disclosed for establishing and utilizing a mobile communication system having a mobile communication coverage area. The mobile communication system includes a plurality of mobile communication devices or units and a mobile base. The mobile base establishes a communication coverage area and provides mobility with respect to the coverage area. Communications between the plurality of mobile communication devices are transmitted to the mobile base, and retransmitted or re-broadcast from the mobile base to the destination mobile communication units.

32 Claims, 12 Drawing Sheets

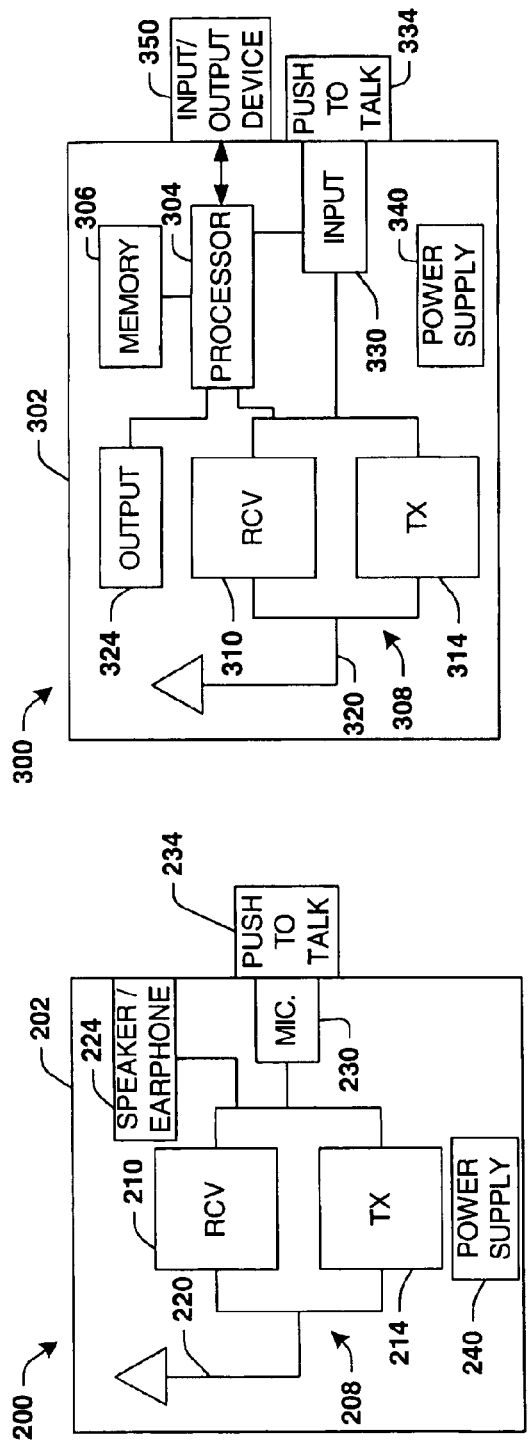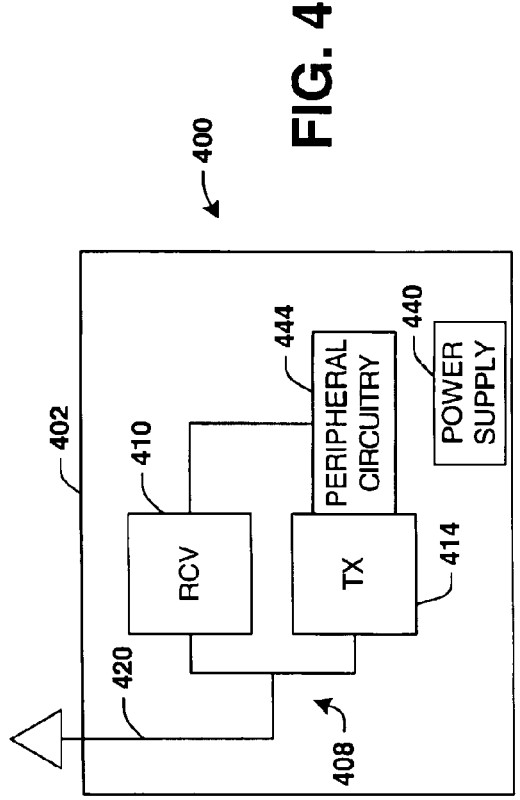

COMMUNICATION SYSTEM WITH MOBILE COVERAGE AREA

TECHNICAL FIELD

The present invention relates to communications and, more particularly, to a communication system with a mobile coverage area.

BACKGROUND OF THE INVENTION

The use of communication systems having wireless mobile communication units has become widespread. Wireless communication systems that operate within a cell or coverage area provide several important advantages over conventional wired systems. For example, wireless communication users can communicate in locations where wired service is not available or feasible, such as remote or rugged locations. Additionally, wireless communication users within the cell have much more mobility because the units do not have to be connected to a fixed wired network. These and other favorable characteristics make wireless communications ideally suited for personal, business, military, search and rescue, law enforcement, water vehicle, and other field related applications.

Common approaches to providing wireless communication systems include two-way radio systems and cellular systems. Despite the benefits of these approaches, they have several drawbacks. First, the cell size or range of units within these systems depends, at least in part, upon the power provided to the units. Typically, disposable or re-chargeable batteries are incorporated into wireless communication devices to provide operating power to the devices. The batteries can provide different amounts of power to units, depending on the size and/or weight of the batteries. For instance, a small battery may provide on the order of 100 milliwatts to a unit, and may be compact and lightweight enough to be incorporated into a cellular telephone. However, such a small battery provides only enough power to facilitate a range of a few miles, and only for a few hours.

It is for this reason that a plurality of fixed base stations or towers need to be constructed within a couple of miles of one another to make cellular systems effective. The towers define multiple cells and serve to, among other things, receive the weak signals transmitted by cellular telephones, so as to achieve usable range even as the cell phones themselves achieve only a short range. The towers also extend the operating life of the cell phone batteries, by enabling the units to transmit at a low power level. However, such towers are expensive, and take a substantial amount of time to construct. The cost of building such base stations is not warranted in some instances, such as in extremely remote areas. And, it may not be possible or desirable to build towers at other locations, such as on battlefields or in war zones, where the communication coverage area or cell needs to remain mobile, and the towers themselves would represent vulnerable targets for the enemy.

Two-way (e.g., peer-to-peer) radio systems do not need to be connected to a fixed network, an advantage is some operating scenarios, as compared to cellular systems. Larger batteries (e.g., on the order of two to twenty-five watts) are often utilized in two-way radios to expand the range of a system without the use of towers. However, even the power of the larger batteries is quickly consumed if the two-way radios are used often, or over a long range. In addition to battery issues, two-way radio systems can be limited to line-of-sight type radio systems that have constraints, such as antenna size and/or line-of-sight constraints. Military line-of-sight type radios are typically VHF (Very High Frequency) or UHF (Ultra High Frequency) radios that broadcast in frequencies from about 30 MHZ to 300 MHZ, and have effective ranges of about 5 to 25 miles, based on RF power, the antenna/mast height used with the radio, and other factors. These VHF/UHF radio types can have their coverage obscured by mountains or other line-of-sight obstructions, but are used because these radio bands can be highly reliable. Other radio types can at times provide operate beyond-line-of-sight service, for example, HF (High Frequency) radios. HF radios broadcast in frequency ranges from about 1 MHZ to about 20 MHZ, and can at times achieve with much longer ranges than VHF/UHF radios. However, the HF radio broadcasts are much less reliable than the VHF/UHF radio broadcasts types.

Existing communications systems (voice, data, etc.) to and from dismounted individual users on a battlefield have severe technical limitations that impede and degrade tactical operations in significant ways. Existing problems areas include battery life, range, relaying, safety, weight, complexity of operation, setup and configuration time, and missing functionality. Similar problems plague electronic communications to small mobile teams in other domains, e.g., search-and-rescue teams, law enforcement agents in the field, etc. The fundamental problem with current implementations involves limitations in the present art of how electronic communications (e.g., voice, data, imagery) is implemented for such teams. Weight, size, and battery life are significant design drivers for how a radio carried by an individual (e.g., in the hand, in a backpack, or attached to the body by some other means such as slung from the belt) is designed and implemented. Most current art uses single-channel radios with "push-to-talk" channel access for these types of applications. These work fairly well in smooth terrain for communications within the team, but work poorly within the team in rugged terrain, and work poorly in any terrain at connecting the team to a distant "home base". They also are very limited in terms of communication access (e.g., cannot talk to other users on different frequencies, hop-sets, cryptographic variables, etc.).

The selection of the single-channel push-to-talk radio drives a communications range requirement, which drives an RF power requirement, which drives battery utilization. The result is that the weight of the batteries required to operate for even 24 hours usually exceeds the weight of the radios. In the military, ideally an individual would go to the field with batteries sufficient for at least 72 hours of non-stop operation. That is simply not possible when single-channel push-to-talk radios are used. Another related problem is antennas. The frequency bands of these sort of single-channel push-to-talk radios require masts and antennas that are a few feet long. This is awkward and ungainly for individual use. A secondary problem with current implementations involves poor selection of functionality for the data/information portion of the capability. Present implementations tend to be too complex, present too much low-value information, require too much manual action (e.g., typing) on the part of the mobile user, and require the user to hold a computer in his hands, even to accomplish emergency or other actions where a short response-time is required. Many current systems place equipment on the soldier's helmet, and dangle eye-piece computer displays in front of his face, both of which present serious safety issues.

SUMMARY OF THE INVENTION

The following presents a simplified summary of the invention in order to provide a basic understanding of some aspects of the invention. This summary is not an extensive overview of the invention. It is intended neither to identify key or critical elements of the invention nor delineate the scope of the invention. Its sole purpose is to present some concepts of the invention in a simplified form as a prelude to the more detailed description that is presented later.

The present invention relates to systems and methods for establishing and utilizing a mobile communication system having a mobile communication coverage area. One or more aspects of the present invention address issues including, but not limited to, battery life, battery size, battery weight, communication range, relaying, safety, complexity of operation, and setup and configuration requirements. The mobile communication system includes a plurality of mobile communication devices or units (e.g., two-way radios). A mobile base is included, establishing a coverage area or cell. Communications between the plurality of mobile communication devices is transmitted to the mobile base, and retransmitted or re-broadcast from the mobile base to the destination mobile communication units. The mobile base can be a repeater or relay that simply re-broadcasts the communication at an increased power level. Alternatively, the mobile base can be a router that intelligently routes the communication to desired destination mobile communication units, including bridging disparate networks.

In another aspect of the invention, the base is located aboard an aeronautic vehicle (which need not be manned), thus mitigating one or more line-of-sight issues. The aeronautic vehicle can reside above the mobile communication devices, and move with the mobile communication units, thus, providing a mobile coverage area. The base includes a power source that enables the transmissions to be re-broadcast at an increased power level. The aeronautic vehicle can reside above the coverage area of the mobile communication unit, at a modest elevation, for example, less than about seven kilometers (e.g., about three miles) above the mobile communication units. As such, the mobile communication units can employ low levels of RF power, permitting them to operator off of small batteries; they can also be sited at frequencies that permit the use of small internal antenna(s); this combination of features enhances their mobility and practicality.

In one aspect of the invention, the mobile base (and/or the MCUs) includes a camera for capturing images of area within the coverage area. One or more of the mobile communication units may be outfitted with a global positioning system, and may be operable to transmit location information to the mobile base. As such, the image of the area and/or the location of items within the area may be presented as a map on any or all of the mobile communication units. The location information of the mobile communication units within the area can be provided automatically to the mobile communication units and periodically updated, so that units within a team (or outside a team) can be provided with unit location information and georeference data on items within the geographical area.

In another aspect of the invention, functions are automated such that a user can select a "button", "function key", or "touch screen pad" to provide automatically location information to other units in the area or a home base. For example, a button array can be provided to a user, such as a solider that includes a "Check Fire" button that when depressed and confirmed, alerts others in and/or out of the area of the location of the soldier and directs them immediately to stop firing at his location, thereby avoiding friendly fire incidents. Additionally, the button array can include a "911" or "Help" button that when depressed and confirmed, alerts others in and/or out of the area that the user is in trouble, requests assistance and/or evacuation, and provides location information of the user to the rescuers. The confirmation can be provided by another button "button", "function key", or "touch screen pad", so as to minimize the work load induced onto the user.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

BRIEF DESCRIPTION OF THE DRAWINGS

FIG. 2 illustrates a block diagram of a mobile communication unit in accordance with one or more aspects of the present invention.

FIG. 3 illustrates another block diagram of a mobile communication unit in accordance with one or more aspects of the present invention.

FIG. 4 illustrates a block diagram of a mobile base in accordance with one or more aspects of the present invention.

DETAILED DESCRIPTION OF INVENTION

Figure 1:
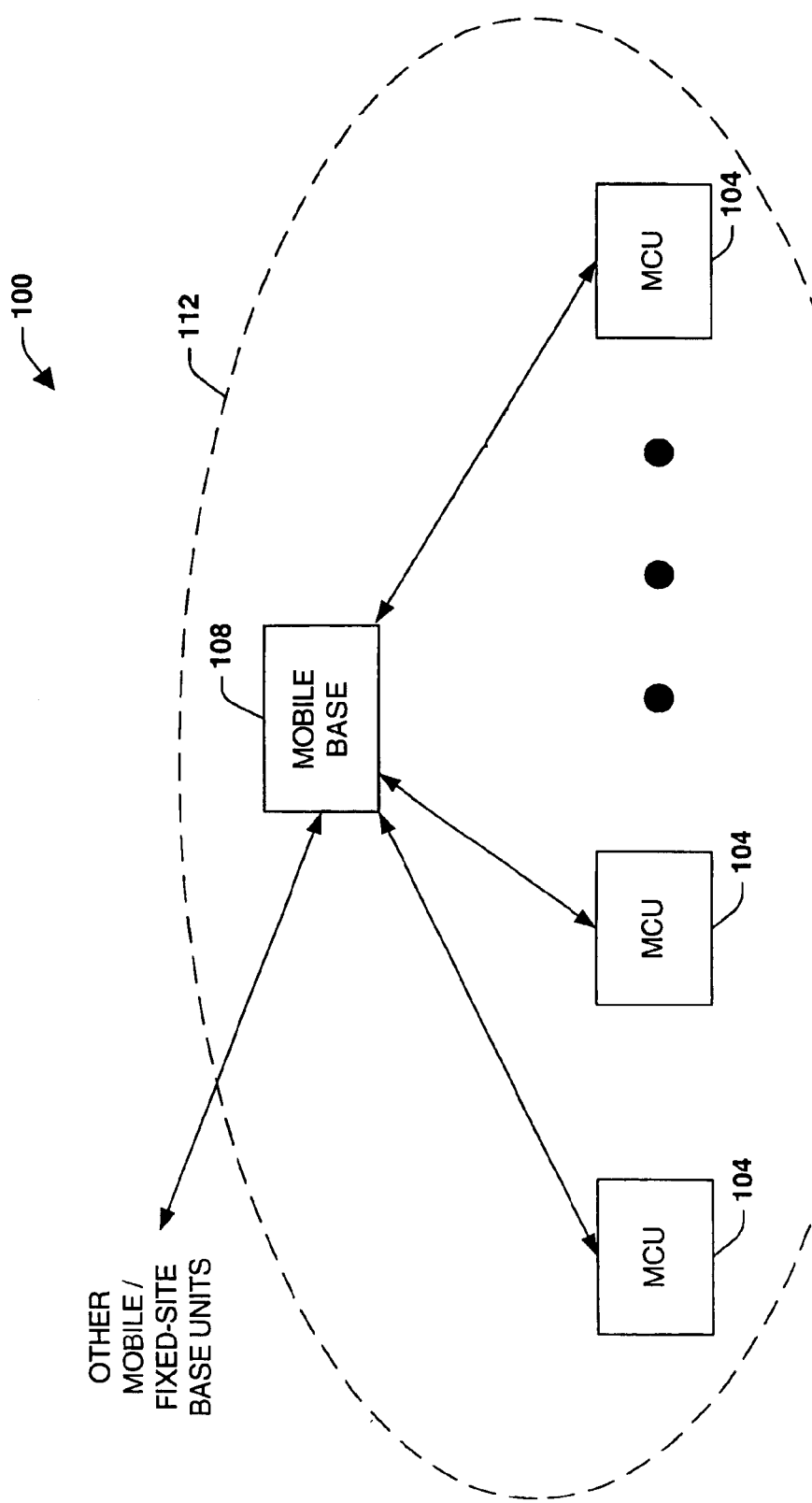
FIG. 1 illustrates a block diagram of a mobile communication system in accordance with one or more aspects of the present invention.

The present invention relates to systems and methods for establishing and utilizing a mobile communication system having a mobile coverage area. The mobile communication system includes a plurality of mobile communication devices or units, and a mobile base. The mobile base establishes a coverage area of the communication system. Communications between the plurality of mobile communication devices are transmitted to the mobile base, and retransmitted or re-broadcast from the mobile base to the destination mobile communication units. As a result, smaller mobile communication units with increased functionality and smaller transmission power can be provided having a coverage area similar to larger mobile communication units having substantially larger transmission power.

The present invention provides for a radio communication system that can be employed in military applications. The radio communication system provides radio devices with tactically-significant battery life (days), reasonable battery weight, and better connectivity and coverage. The radio communication devices are small and compact, and do not disrupt the existing missions of a soldier, since equipment on the helmet or in front of a user's face is not necessary. The total weight of the radio devices can be three to four pounds. The devices can employ significantly smaller antennas/masts than conventional military radio devices. The radio communication devices provide communications that will work in the confusion of actual missions, since many functions are automatic and do not require substantial soldier manual intervention.

In one aspect of the invention, the present invention employs a different paradigm for the communications devices (radios). Instead of using the same radio for communications within the team as well as communications from the team to the "home base", an airborne relay, repeater, or router is employed. This relieves the radio carried on the individual of the necessity to provide the range needed to reach back to the home base, since it only has to reach to the airborne relay. This enables the soldier-carried radio to draw much less power, and thereby provide much-improved battery life. Furthermore, communications within the team are also routed through the airborne relay, allowing intra-team communications to work well even in rugged terrain. The frequency band of the soldier-carried radio can be selected to operate in a range where the antenna is very small (e.g., similar to a pocket Email pager, personal digital assistant, etc.), thereby eliminating the problems induced by the single-channel push-to-talk radio antennas and masts in use by the military today. The airborne relay can be implemented via an unmanned air vehicle, aerostat, or a satellite.

In another aspect of the present invention, the secondary problem of "functional overload" is solved by increasing the number of functions that are fully or largely automatic, and therefore work without requiring any/minimal action by the soldier on the ground. For example, creating a "lapel button pad" as a way for the soldier to provide input (e.g., request medical evacuation, etc.) to the system without having to carry and hold a device in his hand. Another example is by creating a display that can be worn in a location that does not impede his primary mission (e.g., does not have to be carried in the hand, does not have to be worn in front of his face—which disrupts stereoscopic vision and depth perception—etc). For example, inside of the left wrist for right-handers and inside the right wrist for left-handers as a location for the computer display. The remaining functionality is matched to the critical mission functions (e.g., battlefield applications, a search-and-rescue mission).

FIG. 1 illustrates a mobile communication system 100 in accordance with one or more aspects of the present invention. The mobile communication system 100 includes a plurality of mobile communication units (MCUs) 104, such as, two-way radios, for example. The MCUs are operative to communicate with one another wirelessly, and are adapted to transmit and/or receive voice, image, and/or data information (e.g., administrative data, location data, configuration data, priority data). The communication system 100 facilitates transmissions between MCUs at very low power requirements, thus extending the useful life of batteries in the units while also reducing the size and weight of batteries required.

The mobile communication system 100 further includes a mobile base 108 defining a coverage area or cell range 112 of the system 100. The mobile base 108 is operative to receive transmissions from the MCUs 104 and to re-broadcast the transmissions at the same or boosted power levels to other MCUs within the coverage area 112. In accordance with one or more aspects of the present invention, the mobile base 108 can move along with the MCUs such that the entire coverage area 112 is mobile. The mobile base 108 may, for example, be part of an air vehicle moving through the atmosphere, say at an elevation less than about seven kilometers (e.g., about three miles). Since the base 108 is mobile, the coverage area 112 defined by the base can move and, as such, the MCUs 104 can move around without leaving the coverage area 112 thereby maintaining the ability to communicate with other units within the system 100. Additionally, since the mobile base 108 can transmit signals at an increased power level, the communications can be transmitted to other communication devices (e.g., a home base) outside the coverage area 112 directly, or through other mobile and/or fixed-site base units.

In one example, a message (e.g., data, voice) is provided by a mobile communication unit. The mobile communication unit transmits an analog signal (e.g., as radio frequency electromagnetic waves) that is received by all members of the system. More particularly, the analog signal is sent to and re-broadcast by the mobile base 108 (e.g., at increased power levels) so as to reach the other units within the coverage area. The mobile base 108 can be a repeater such that the mobile base simply re-broadcasts the transmission. Alternatively, the mobile base 108 can be a router that provides intelligent routing to specific destination devices.

In another example, a speech pattern or voice message is provided to an input device (e.g., a microphone) of a mobile communication unit, generally when a push-to-talk button is depressed on the unit. The message may then be converted into digitized voice data. The digitized voice data can be in the form of digitized voice packets, such as Voice-Over-Internet Protocol (VOIP) packets, Network Voice Protocol (NVP) packets, or any other form of digitized voice or digitized speech data. Identification information can be provided to the packet containing, for example, data type, data source, data destination, priority, data security, and other information. Any of a variety of encryption mechanisms (e.g., hashing, key pairs) can be employed to encrypt the packet for security purposes. The packets are then converted to an analog signal to be transmitted over the air. The analog signal can be modulated and transmitted over the air as modulated radio (electromagnetic) waves. The mobile communication units can be programmed to frequency hop according to a predefined frequency-hopping scheme over N number of channels, N being an integer.

The voice signal is received by the mobile base 108, demodulated, and provided to a router (not shown) as digital voice data. If the voice data are transmitted with a frequency-hopping scheme, the receiver employs the same frequency-hopping scheme. The digital data can be decrypted and converted back to digitized voice packets. The router reads the packets to determine the intended destination of the voice data, in addition to other overhead and identity information with respect to the voice data. The mobile base then retransmits the signal at an increased power level to the appropriate recipient(s), pursuant to the identity information. The intended recipients may be in the local coverage area of this mobile base unit, in the coverage area of another mobile base unit, or any combination thereof.

FIG. 2 is a block diagram representing the basic structure of a mobile communication unit 200 according to an exemplary configuration. The mobile communication unit 200 is contained within a housing 202 and includes an RF section 208 containing an RF receiver 210 and an RF transmitter 214. The RF receiver 210 is operable to receive RF transmissions from a base station via an antenna 220 internal (or external) to the housing 202. The received transmissions are output to an operator using the MCU 200 through an output device, such as a speaker and/or earphone 224.

The RF transmitter 214 is operable to broadcast information, input into the unit by a user, via the internal (or external) antenna 220. For example, the transmitter can transmit an analog voice message that is spoken into a microphone 230 when the user depresses a push-to-talk button 234. A power supply 240 is included to provide operating power to the unit. The power supply may be a small disposable or rechargeable battery capable of providing, for example, about 100 milliwatts of power to the unit such that the unit can transmit to an airborne mobile base having an elevation less than about seven kilometers (e.g., about three miles). Accordingly, the unit is small and lightweight, yet is capable of remaining in contact with other units within a coverage area by virtue of transmitting to (and through) a mobile base. The mobile communication unit 200 can be in the form of a device mountable on a wrist, belt, or lapel of the user.

FIG. 3 shows an exemplary structure of a mobile communication unit 300 according to a further aspect of the present invention. The mobile communication unit 300 is maintained within a housing 302, and includes a processor 304 or CPU which can be programmed to control and operate the various components within the mobile communication unit 300 in order to carry out the various functions described herein. The processing unit 304 may be any of various commercially available processors. It is to be appreciated that dual microprocessors and other multi-processor architectures may also be employed as the processing unit 304.

A memory 306 is included in the mobile communication unit for storing, among other things, program code executed by the processor 304. The actual code for performing such functions could be easily programmed by a person having ordinary skill in the art of microprocessor programming in any of a number of conventional programming languages based on the disclosure herein. The memory 306 also serves as a storage medium for storing information packets received from or intended to be transmitted to a mobile base. Furthermore, the memory 306 may also store an identification code used to designate and distinguish the mobile communication unit 300 from the other mobile communication units within the coverage area.

The mobile communication unit 300 includes an RF section 308 connected to the processor 304. The RF section 308 includes an RF receiver 310 which receives RF transmissions from a base station via an antenna 320 (potentially) internal to the housing 302. The processor 304 demodulates the signal to obtain digital information modulated therein, and presents the demodulated signal to a user through an output device 324, such as a speaker, a flat panel liquid crystal display with alphanumeric capabilities and/or a variety of other output devices.

The RF section 308 also includes an RF transmitter 314 operable to transmit voice and/or data information via the antenna 320. The RF transmitter 314 is operatively coupled to the processor 304, and is adapted to transmit information (e.g., data, voice) developed in response to a user's input. A user input device 330, such as a microphone connected to a push-to-talk button 334, or a keypad (not shown), is also operatively connected to the processor 304 to facilitate voice and/or data entry. Additionally, an external input/output device 350 is coupled to the processor 304 of the mobile communication unit 300 for invoking automatic functions programmed into the mobile communication unit 300 via a "button array", "function key array", or "touch screen pad" 350. One or more packets are generated by the processor 304. The one or more packets include the voice, data or request information to be transmitted together with a source address (e.g., the address of the particular mobile communication unit sending the information), and one or more destination addresses (e.g., the addresses of destination mobile unit). The information packets are delivered to the RF transmitter 314, which transmits a modulated RF signal associated with the information packets via the antenna 320.

A power supply 340 is included to provide operating power to the unit. The power supply 340 may be a small disposable or rechargeable battery capable of providing, for example, around 100 milliwatts of power to the unit so that the unit can transmit to an airborne mobile base travelling at a modest elevation (for example, about three miles). As such, the unit can be made small and lightweight, while retaining its functionality and practicality.

Turning now to FIG. 4, a block diagram of the basic structure of a mobile base 400 is illustrated in accordance with one or more aspects of the present invention. The base may be comprised in a manned, unmanned (e.g., autopiloted), or remotely controlled air vehicle. The air vehicle may, for example, be a self-contained plane having a wingspan of approximately 20 feet, or an aerostat. It is to be appreciated that more than one vehicle/mobile base may be utilized to provide redundancy within the system. This may be prudent, for example, where the system is utilized to facilitate communications between soldiers fighting in a war zone where the enemy may have anti-aircraft artillery at its disposal. The elevation of the mobile base, mitigates line-of-sight issues, such as where a mountain or other object can block the transmission from one MCU to another MCU.

The mobile base includes an RF section 408 containing an RF receiver 410 and an RF transmitter 414. The RF receiver 410 is operable to receive RF transmissions from mobile communication units (e.g., two-way half-duplex radio) via an antenna 420. The mobile base 400 also includes a power supply 440 capable of supplying power on the order of something substantially more than 100 milliwatts (e.g., 2–25 watts). As such, the RF transmitter 414 can re-broadcast the received transmissions to other MCUs at an increased power level, thus expanding the coverage area of the cell, and enable the signals to reach other base units, both mobile and fixed (the RF unit used for communicating to and from other base units may be separate from the RF unit used for communicating with other MCUs). In this manner, the chance of losing contact with any of the MCUs is mitigated. The mobile base 400 may also include peripheral circuitry 444, such as may be used to track the number and time of transmissions sent and received by the mobile base 400.

Figure 5:
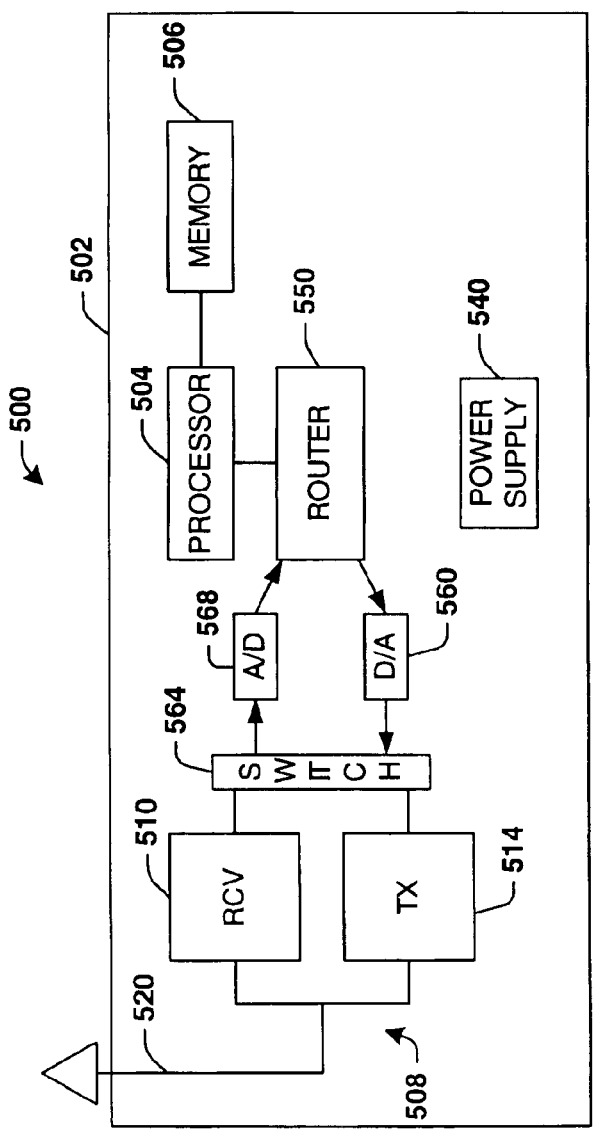
FIG. 5 illustrates another block diagram of a mobile base in accordance with one or more aspects of the present invention.

FIG. 5 shows a block diagram of a mobile base 500 according to one or more further aspects of the present invention. The mobile base includes a power supply 540 generally on the order of something substantially greater than 100 milliwatts such that transmissions received by the mobile base 500 can be re-broadcast at boosted power levels to enhance a coverage area, or to reach another base unit. The mobile base 500 also includes a router 550 that facilitates communications between one or more mobile communication units and/or a central station (not shown). The router 550 processes messages (e.g., data, voice) received from mobile communication units (e.g., two-way half-duplex radios), and routes the voice messages to one or more other mobile communication units and/or a central station. The central station can, for example, be a central command center that provides a task and/or coverage area overview of the entire network. Or, for instance, the central command center can be a search and rescue command center where information (e.g., geographic, environmental, location) can be made available for communication to other units throughout the coverage area.

The base includes a processor 504 coupled to a memory 506 and the router 550. The processor 504 can be programmed to control and operate the various components within the mobile base 500 in order to carry out the various functions described herein (e.g., to execute algorithms stored in memory 506 that facilitates the router 550 routing communications to and from the mobile communication units). The router 550 transmits communications to a radio component 508 through a digital-to-analog converter (D/A) 560. The radio component 508 is coupled to a transmit and receive radio frequency (TX/RX RF) switch 564 which selects between transmitting and receiving communications by a transmitter 514 and a receiver 510, respectively, via one or more antennas 520. The D/A and A/D converters may be embedded into the receiver and transmitter.

The router 550 receives communications (e.g., voice, data, requests) through the antenna 520, receiver 510, switch 564, and an analog-to-digital converter (A/D) 568. The analog-to-digital converter (A/D) 568 converts a received analog message into a digitized packet of data. The router 550 then processes the digitized packet of data (e.g., via the processor 504). The digitized data may, for example, be subjected to decryption, demodulation, and/or format conversions. Routing information is then extracted from the data, and the message is re-broadcast according to this information (e.g., to a central station and/or one or more MCUs).

Figure 6:
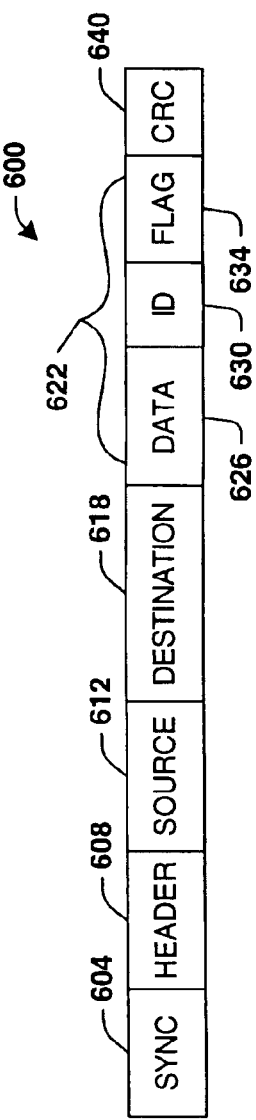
FIG. 6 illustrates a digitized data packet in accordance with one or more aspects of the present invention.

FIG. 6 illustrates an exemplary format for a digitized packet of data 600 in accordance with one or more aspects of the present invention. The packet 600 includes a number of fields such as a synchronization field 604, a header field 608, a source address field 612, a destination address field 618, a data field 622, and an error correcting field (CRC) 640, for example. Other fields are possible (e.g., time of day, priority, etc.). The synchronization field 604 includes synchronizing bits which allow a device receiving the packet an opportunity to "sync" to the packet, as is conventional. The header field 608 follows the synchronization field 604, and includes information such as the length and/or type of the packet 600. The source address field 612 follows the header field 608, and includes an address of the device from which the packet 600 originated.

Following the source address field 612, the packet includes a destination address field 618 which holds the address of the device (or devices) to which the packet 600 is ultimately destined. The data field 622 includes a data portion 626 containing digitized data, such as a voice packet (e.g., VOIP packet, NVP packet). The data field 622 also includes a device ID field 630 which contains an identification code for the particular mobile communication unit. The identification code identifies and distinguishes the mobile communication unit from other mobile communication units within a coverage area. The data field 622 further includes a flag field 634 which is indicative of the current status of the mobile communication unit with respect to the system. For example, setting the flag field 634 to "ON" may indicate that this is the first time the mobile communication unit has transmitted in the network, while setting the flag field 634 to "OFF" may indicate that the MCU has already been active within the system. The packet 600 ends with a cyclical redundancy code (CRC) field 640 which serves as an error correcting field according to conventional techniques such that a receiving device can determine if it has properly received the packet.

Figure 7:
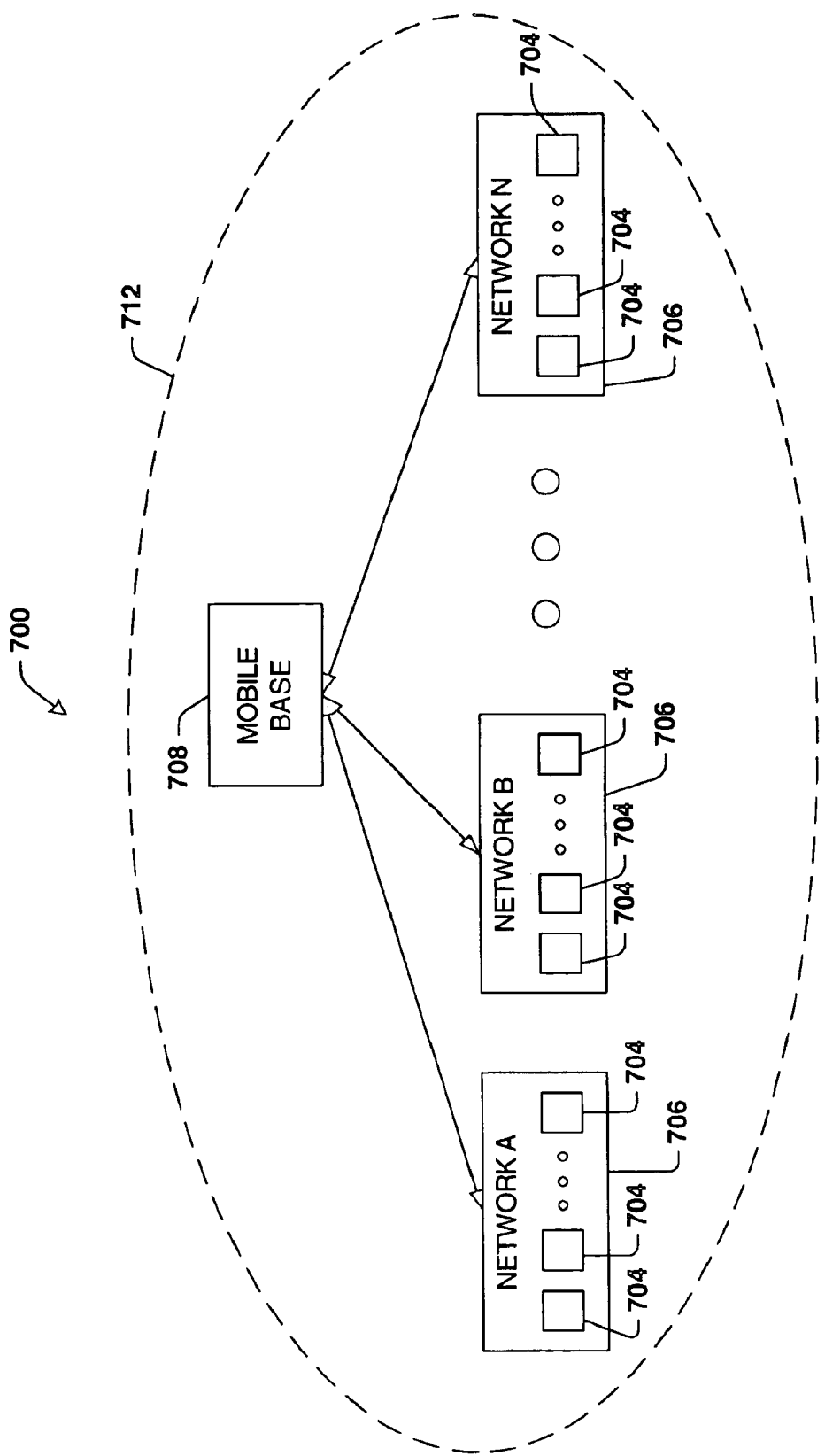
FIG. 7 illustrates a mobile communication system configured into a plurality of logical networks in accordance with one or more aspects of the present invention.

Turning to FIG. 7, in accordance with one or more aspects of the present invention, different sets 706 of MCUs 704 may be able to communicate within a mobile communication system 700 having a coverage area 712 defined by a mobile base 708. In particular, the MCUs 704 are configured to operate in respective logical networks A, B thru N (where N is an integer). A transmission from any MCU 704 is transmitted to the mobile base 708, wherein a router (not shown) determines routing information within the transmission, and routes the message to the appropriate one or more MCUs 704 in any of the logical networks 706. The router allows units of different types to communicate with one another through the router. The router also allows communication to occur with MCUs having any one of different frequency hopping schemes, different encryption schemes, and/or different modulation schemes using different protocols.

The router can, for example, be programmed to decrypt and/or decipher data in one protocol from a first radio type, and provide a separate encryption and protocol to the data to send through a second radio type. The router also extracts routing information from the data and transmits the data to specific radios 704 in a desired logical network 706. Data can be queued in the mobile base 708 for transmission according to priority to multiple logical networks. For instance, voice messages can have priority over data messages. However, in some circumstances data messages may be more important and take priority over data messages. Alert messages can take priority over all other messages. Additionally, task and member priority information can provide membership priority. For example, certain members (e.g., leaders) have priority over other members (e.g., general members), such that their voice messages should be transmitted as a priority over other members.

The router can route voice communications between mobile communication units 704 that are of different radio types, different frequencies and/or different frequency hop-sets, and different cryptographic variable sets. The router can also be dynamically updated when a new member (e.g., mobile communication unit, router) enters the network. The router is then provided (perhaps automatically) with information related to parameters (e.g., radio type, frequency hop-set, cryptographic variable set, network or subnetwork address) associated with the new unit.

The router can determine that a new mobile communication unit 704 has entered the system 700 and desires to join one or more of logical networks. The router then retrieves information from the mobile communication unit 704, and adds the mobile communication unit to a router database. This information can be sent to other routers (not shown) as administrative information, such that the routers can update their respective router databases. The messages can then be routed to the ultimate destinations. It is to be appreciated that administration information can be retrieved from routers and/or the mobile communication units periodically to facilitate dynamic updating. Additionally, the router may be adapted to perform administration updates (e.g., a dynamic routing protocol) based on movement and location of MCUs 704.

It is to be appreciated that the router can be programmed and/or periodically updated with administrative data, location data, configuration data, priority data, member types (e.g., radio types, router types), communication characteristics (e.g., different frequency hop-sets), member security information (e.g., cryptographic variable sets), priority information, network parameters and configuration timing information, for example. It is to be further appreciated that multiple routers on multiple aeronautic vehicles may be utilized to expand the range of the coverage area or cell and/or define multiple overlapping mobile cells. The routers can communicate with one another to relay transmissions, update administrative information as mobile units move from cell to cell or within a cell.

Figure 8:
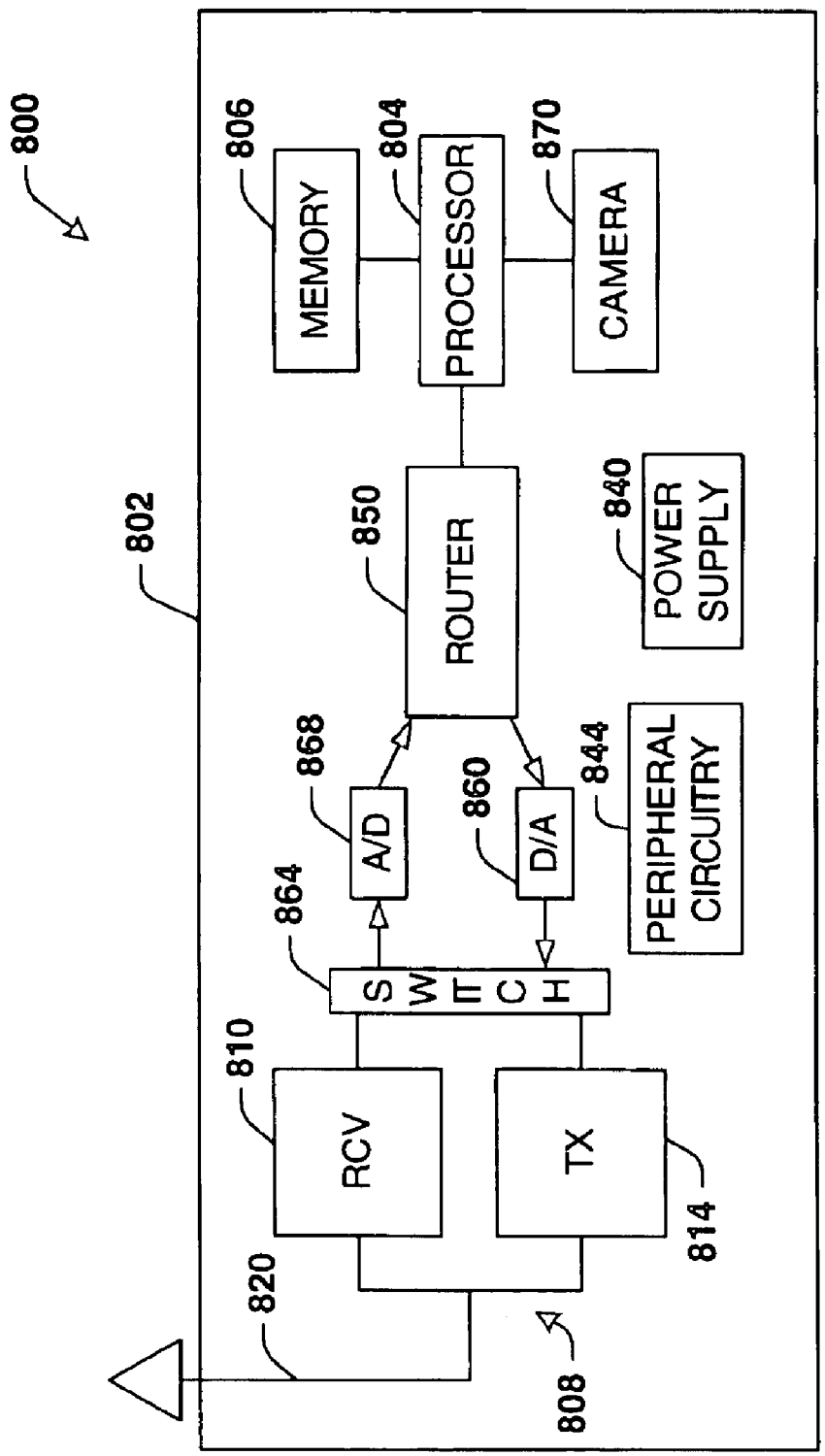
FIG. 8 illustrates yet another block diagram of a mobile base in accordance with one or more aspects of the present invention.

FIG. 8 is a block diagram of an exemplary mobile base 800 according to one or more further aspects of the present invention. The mobile base 800 includes a power supply 840 for providing power to the mobile base 800. The mobile base 800 also includes a router 850 that facilitates communications between one or more mobile communication units. The router 850 processes messages (e.g., data, voice, requests) received from mobile communication units (e.g., two-way half-duplex radios), and routes the messages to one or more other mobile communication units. The mobile base 800 includes a processor 804 coupled to a memory 806 and the router 850. The processor 804 can be programmed to control and operate the various components within the mobile base 800. Additionally, the processor 804 can be programmed to provide the mobile communication units with automatic updates of unit location information and georeference data of items within the geographical area. In this manner, the units can avoid or move to specific areas based on the received data. Additionally, the processor 804 can be programmed to receive requests from the units, such as providing a home station with updated location information and emergency alert notifications.

The router 850 transmits communications to a radio component 808 through a digital-to-analog converter (D/A) 860. The radio component 808 is coupled to a transmit and receive radio frequency (TX/RX RF) switch 864 which selects between transmitting and receiving communications by a transmitter 814 and a receiver 810, respectively, via one or more antennas 820. The router 850 receives communications (e.g., voice, data) through the antenna 820, receiver 810, switch 864 and an analog-to-digital converter (A/D) 868. The analog-to-digital converter (A/D) 868 converts a received analog message into a digitized packet of data. The router 850 then processes the digitized packet of data (e.g., via the processor 804).

The mobile base 800 includes a camera 870 operatively connected to the processor 804. The camera 870 allows the mobile base 800 to obtain image data, digital or otherwise, which can be provided to one or more MCUs maneuvering within a mobile coverage area or cell. The camera 870 can, for example, take digital and/or topographical photos of the ground within the coverage area. These photos can be transmitted, as in manners described above, to one or more MCUs within the coverage area, and be displayed thereon via a liquid crystal display panel, for example. The camera 870 may also be an electro optical infra-red camera that can provide real time video data. This information may be useful to determine, for example, when and where an object may be encountered. The camera could be replaced or supplemented by other sensor devices (e.g., synthetic aperture radar, hyperspectral camera, chemical detectors, etc.). A camera and/or other sensors could also be added to an MCU (e.g., connect a camera and/or other sensors to the processor in FIG. 3 and/or FIG. 9).

Figure 9:
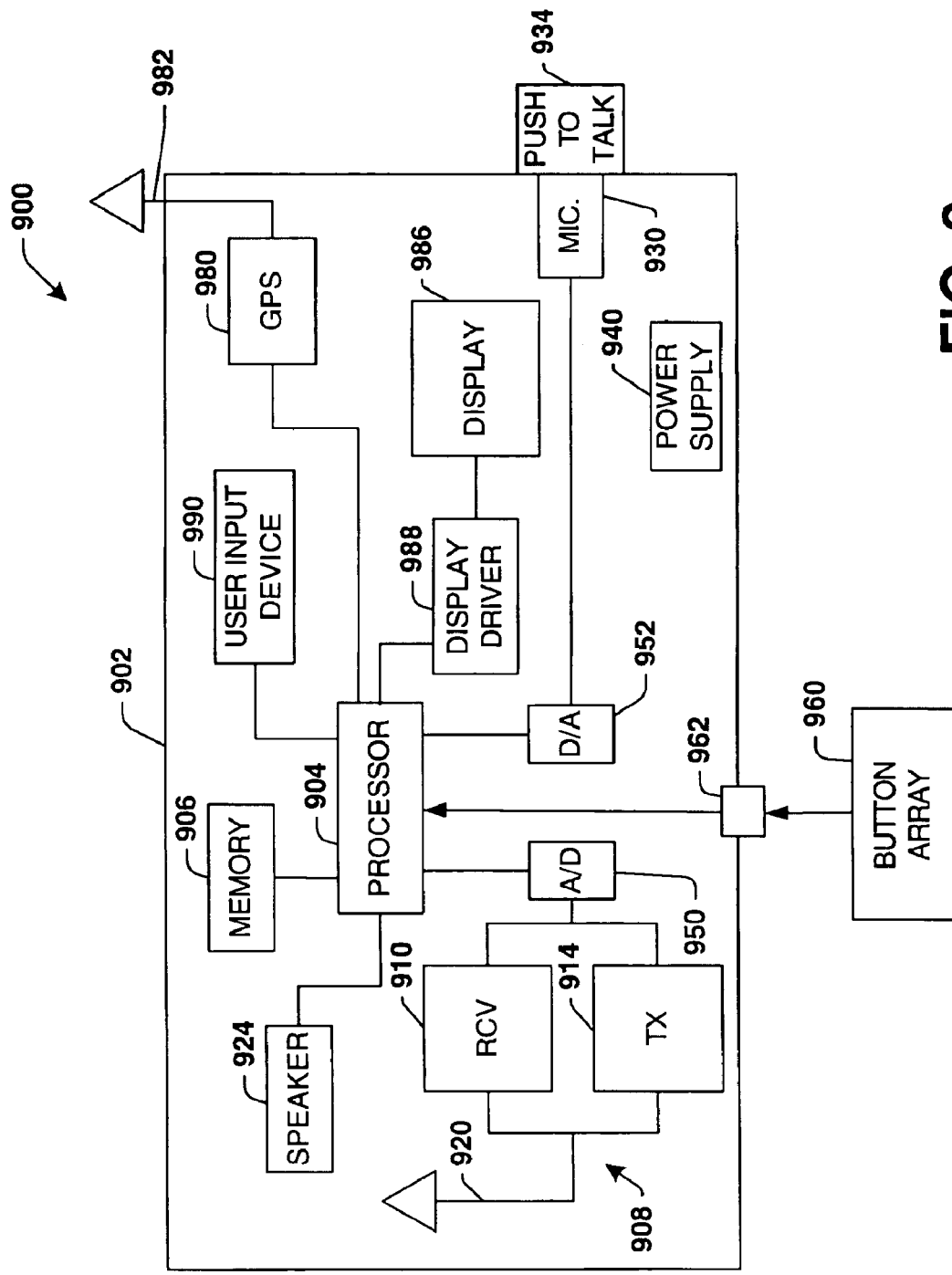
FIG. 9 illustrates yet another block diagram of a mobile communication unit in accordance with one or more aspects of the present invention.

FIG. 9 is a schematic block diagram illustrating an exemplary mobile communication unit 900 according to one or more further aspects of the present invention. The mobile communication unit 900 is contained within a housing 902 and includes an RF section 908 containing an RF receiver 910 and an RF transmitter 914. The RF receiver 910 is operable to receive RF transmissions from a base station via an antenna 920 internal to the housing 902. The received transmissions are provided to a processor 904 through an analog/digital converter 950. The processor then outputs the transmission through an output device, such as a speaker 924 or a display 986 based on the type of communication received. The RF transmitter 914 is operable to broadcast information, input into the unit by a user, via the internal antenna 920. For example, the transmitter can transmit an analog voice message that is spoken into a microphone 930 when the user depresses a push-to-talk button 934. The microphone 934 is coupled to a digital/analog converter 952 converts the analog signal to digital data to be processed by the processor 904. The processor 904 provides the processed voice data to the transmitter 914 via the analog/ digital converter 950 for transmission. A power supply 940 is included to provide operating power to the unit.

The MCU includes a global positioning system (GPS) 980 suitable for use in determining the position of the unit 900. The GPS includes an antenna 982 that may extend slightly through the housing 902 of the MCU, but not to such a degree so as to impinge on the practicality and compactness of the unit (e.g., a few inches). The GPS 980 receives signals from a constellation of satellites to determine the position of the unit 900. The satellites are arranged in multiple planes so that signals can be received from at least four satellites at any position on earth, and more often from six to eight satellites at most places on earth. Each GPS satellite transmits two spread spectrum, L-band carrier signals, so as to mitigate errors that may arise due to refraction of the transmitted signals by the ionosphere. The signal propagation times from the four or more of satellites can be utilized to determine the latitude, longitude, and altitude of the unit 900. This information can be transmitted to a mobile base, and re-broadcast to other units within a mobile coverage area.

This, as well as other information, such as a map of the area can be stored in a memory 906 of the unit 900. The map can be received from a mobile base via a command station transmitting pre-compiled map data and/or an image of the area received from a mobile base via a camera. The information can be combined and presented to a user on a display 986 of the unit 900. The display 986 is connected to and controlled by a processor 904 via a display driver circuit 988. The display 986 can be a flat panel liquid crystal display or any other type of display suitable for displaying this and/or other information as will be appreciated. The housing 902 of the unit 900 may be constructed to protect the display 986 when not in use. For example, the unit 900 may be capable of folding roughly in half with the housing 902 acting as a protective outer shell. Such a folding configuration may make viewing and reading the display easier in bright light, such as where a portion of the housing 902 acts as a canopy to block some of the light.

With the foregoing functionalities, the unit 900 may resemble a personal digital assistant (PDA) having GPS and voice/data communication capabilities, while remaining substantially compact and lightweight (e.g., 3 to 4 pounds). The unit 900 can be mountable to a user's wrist to mitigate disruption to the user during non-use. This is true even though a battery 940 capable of providing a little over 100 milliwatts may be utilized in the unit. Software and/or other code or executables may be installed on the unit and executed by the processor 904 to provide additional functionality to the unit. The GPS determined locations of other units, within the mobile coverage area or cell, can be received from the mobile base and presented on the display, thus enabling a user to have a visual of his or her position relative to others. This information can be updated continually or periodically to track the movement of others. The unit 900 may include an input device 990 (e.g., keypad, tactile sensitive display) enabling the user to interact with the unit and select a variety of different functions.

A button array 960 is coupled to the processor 904 via a port 962. The button array includes one or more buttons to automatically invoke execution of one or more programs residing on the communication unit 900 and/or mobile base station. For example, a button array can be provided to a user, such as a solider that includes a "Check Fire" button that when depressed and confirmed, alerts others in and/or out of the area of the location of the soldier and directs them to stop firing at his location, thereby avoiding friendly fire incidents. Additionally, the button array can include a "911" or "Help" button that when depressed and confirmed, alerts others in and/or out of the area that the user is in trouble, requests assistance and/or evacuation, and provides location information of the user to the rescuers. The confirmation can be provided by another button so as to minimize the necessary interaction by the user. The "Check Fire" button and the "Help" button can be closed buttons, such that the user does not accidentally depress the button, while the "confirmation" button can be an open button. The button array 960 can be a lapel button-array that can be worn on a jacket or vest of a soldier. Additionally, the communication unit 900 can be mountable to a wrist or also be worn on the jacket of vest of a soldier. Therefore, the entire communication unit 900 does not impede the user, and includes functionality that minimizes the work load induced upon the user.

Figure 10:
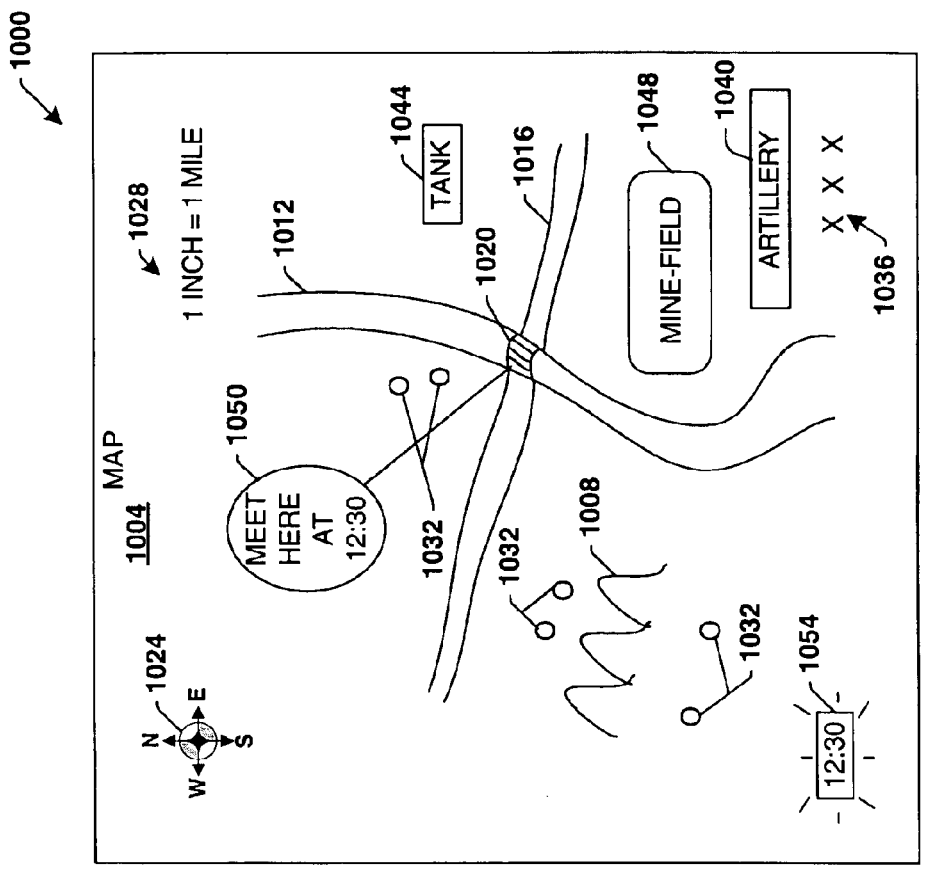
FIG. 10 illustrates a representation of a map in accordance with one or more aspects of the present invention.

FIG. 10 illustrates an exemplary display 1000 on a MCU in accordance with one or more aspects of the present invention. A map 1004 of an area, as captured by a camera, for example, of a mobile base and transmitted to the unit, may include elements of the terrain, such as mountains 1008, rivers 1012, roads 1016, bridges 1020, etc. The map 1004 may also include a compass 1024 and a legend 1028 to assist with reading the map. GPS capabilities of units operating within the area may provide location information (e.g., longitude, latitude) through a mobile base so that their relative positions 1032 can be presented on the map.

Other items of interest may also be represented on the map and/or as icons on the MCU. For instance, where the MCU is utilized in the context of military operations, enemy infantry 1036, artillery 1040, tank 1044, minefields 1048, etc. may be shown on the map. The respective locations of these items may be determined, for example, by soldiers on the ground which can spot the items and utilize some type of range finder (e.g., hand-held laser beam range finder) to determine the distance of these items from the soldiers. Alternatively, location information can be entered manually by a soldier that estimates the location of items such as tanks, minefields, etc. These items can then be drawn on the map at appropriate distances from the soldiers' GPS determined coordinates. Similarly, when friendly fire gets too close, soldiers on the ground can request that the targeted coordinates be adjusted away from the soldiers' location. This can be accomplished, for example, where a soldier sends a message such as "CHECK FIRE" at location "longitude", "latitude" (where longitude and latitude are filled-in automatically by the MCU), to a command center by way of a mobile base. This can also be accomplished at the source where commanders monitor the position of soldiers at a command station via location transmissions from MCUs routed through a mobile base.

Rendezvous times and coordinates (e.g., corresponding to the location of a bridge 1020) can be communicated from a central command through a mobile base to one or more of the MCUs 1032 to facilitate an evacuation or reconnaissance mission for medical or other reasons. The message can be presented as an email, a page message, and/or on the map as an indication of where and when to meet 1050. A time display 1054 on the map may flash and/or an alarm may sound when it is time to meet. A clock may also count down the time remaining until a scheduled rendezvous and sound an alarm at a predetermined period before hand. Having the ability to view the surrounding topography assists soldiers in choosing a suitable route to the rendezvous point. Broadcasting this information through a mobile base (e.g., about three miles up), instead of relaying it through other ground units, mitigates the possibility that some soldiers will not get the message due to line-of-sight constraints (e.g., mountains 1008).

Figure 11:
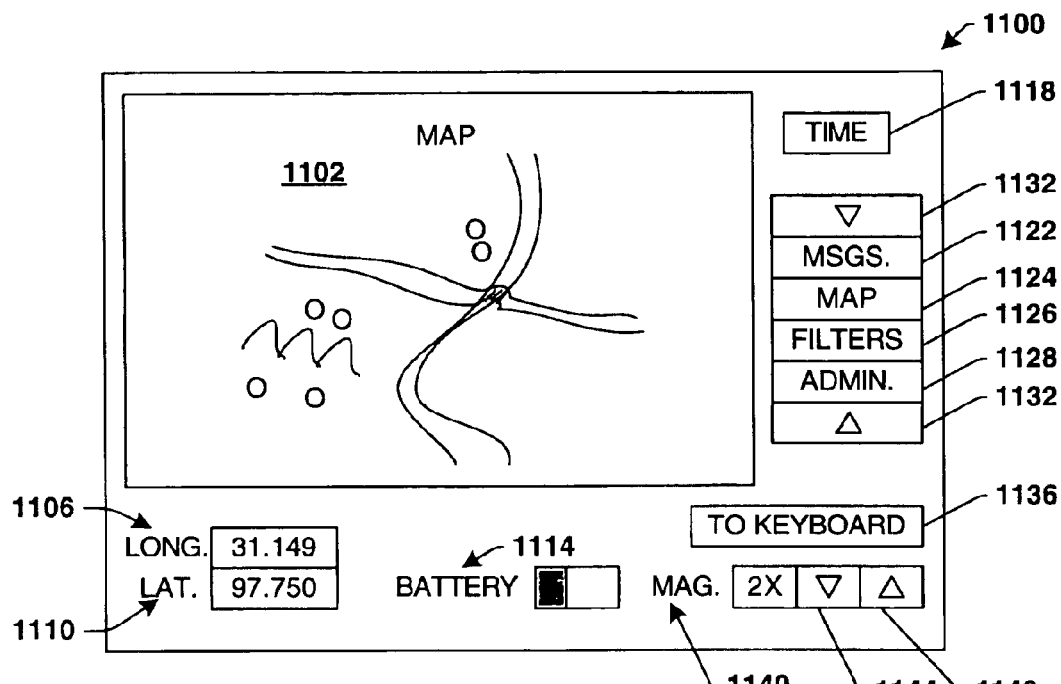
FIG. 11 illustrates a representative map display in accordance with one or more aspects of the present invention.

FIG. 11 illustrates an example of a screen display 1100 for a mapping function in accordance with one or more aspects of the present invention. A map section 1102 is included to show a map, such as that depicted in FIG. 10. The screen also includes the global position (e.g., longitude 1106, latitude 1110) of the unit, battery status 1114 and the current time 1118. Buttons exist to enable a user to choose particular functionalities (e.g., messaging 1122, mapping 1124, filtering 1126, administrative 1128), and scroll buttons 1132 are included to allow a user to get to additional functionalities. A keyboard button 1136 is included to facilitate text/alphanumeric entry, such as may be implemented through a touch screen. A magnification control 1140 is included to enable a user to zoom in or out on an area of the map (e.g., down arrows 1144, up arrows 1148).

Figure 12:
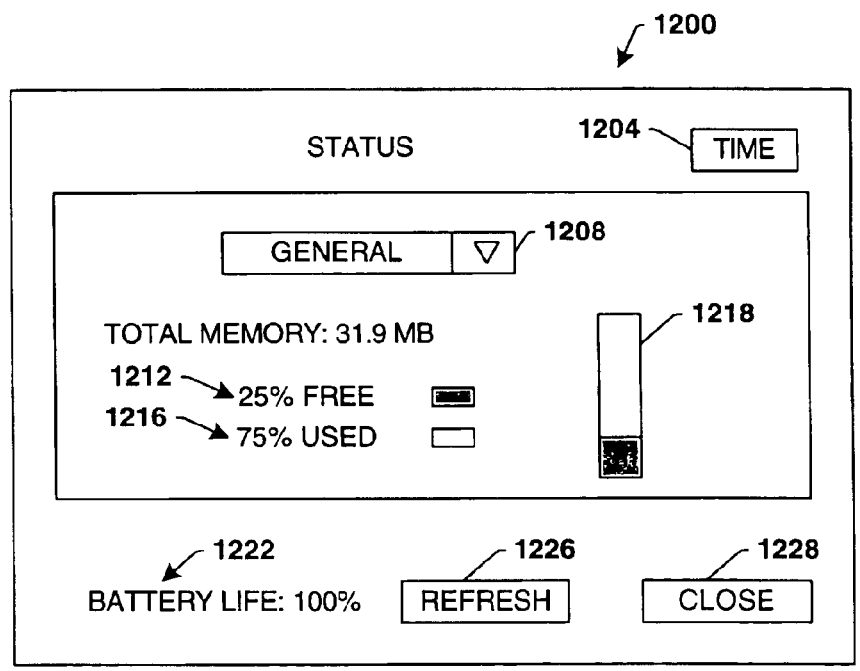
FIG. 12 illustrates a representative status display in accordance with one or more aspects of the present invention.

FIG. 12 illustrates an example of a screen display 1200 for checking the status of a MCU in accordance with one or more aspects of the present invention. The time 1204 is displayed, as is a drop down menu 1208 allowing a user to choose the type of status to be examined. In the general status window illustrated, the amount of memory available 1212 and the amount of memory used 1216 is shown (both graphically 1218 and textually 1212, 1216), as is the charge remaining on the battery 1222. Refresh 1226 and close 1228 buttons are included to allow a user to periodically view an updated status of the unit and to close out of this screen, respectively.

Figure 13:
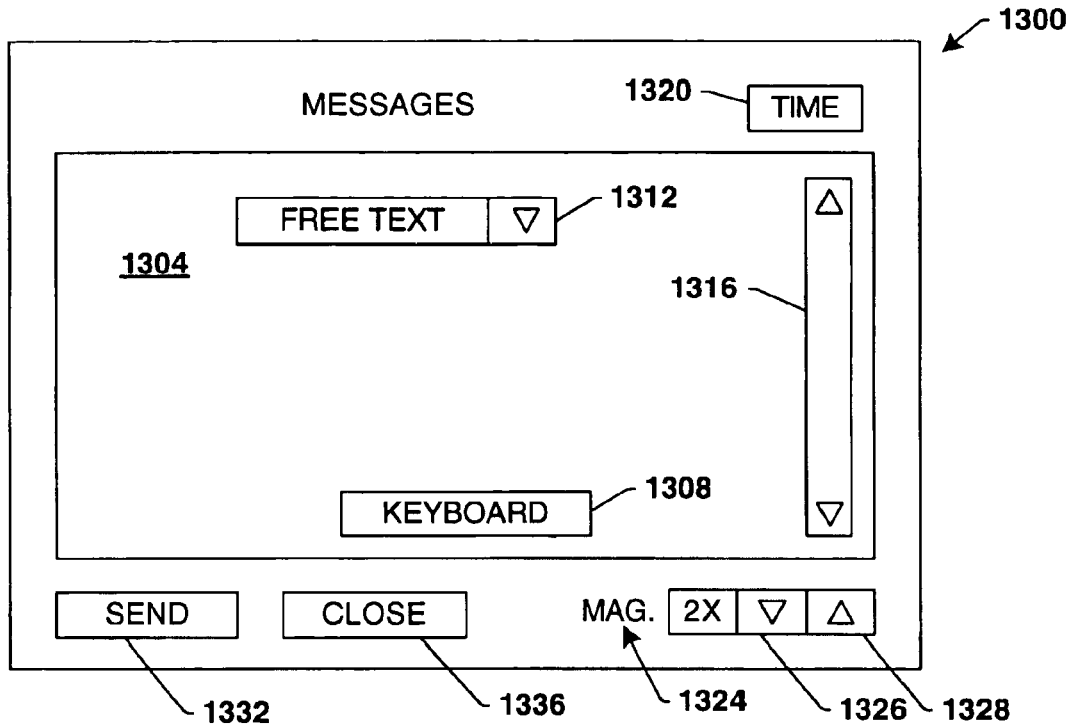
FIG. 13 illustrates a representative message display in accordance with one or more aspects of the present invention.

FIG. 13 illustrates an example of a screen display 1300 for entering a text message into a MCU in accordance with one or more aspects of the present invention. A text area 1304 is included wherein entered text appears and wherein a keyboard 1308 is represented, such as may be implemented via a touch screen. A drop down menu 1312 allows a user to choose from a list of entry options (e.g., text, numeric, alphanumeric). A scroll bar 1316 allows a user to scroll through entered text. The time 1320 is displayed, as is a magnification option 1324 allowing a user to zoom in or out of entered text (e.g., down arrows 1326, up arrows 1328). Send 1332 and close 1336 buttons are included to enable a user to send a composed message or to exit out of this screen, respectively.

Figure 14:
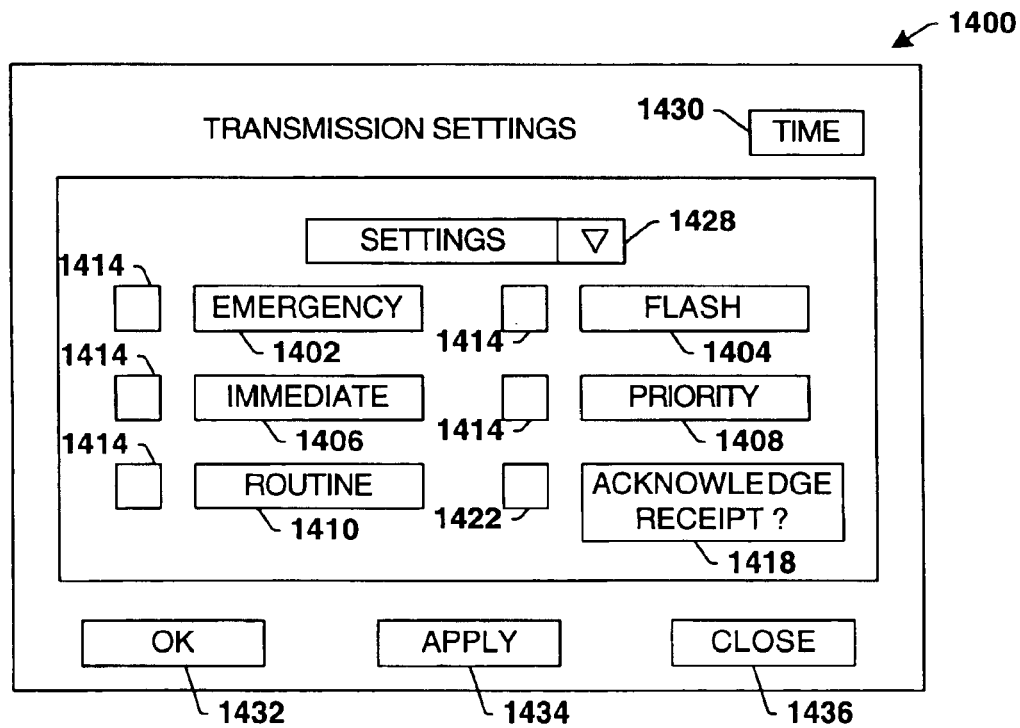
FIG. 14 illustrates a representative settings display in accordance with one or more aspects of the present invention.

FIG. 14 illustrates an example of a screen display 1400 for setting the priority of transmissions. Options, such as emergency 1402, flash 1404, immediate 1406, priority 1408 and routine 1410 are presented to designate the importance of a message, for example. Respective check boxes 1414 are included to enable a user to select the appropriate option. An acknowledge receipt option 1418, having a respective check box 1422, is also included to enable a user to designate whether he or she wants to know when transmissions are actually received. A drop down menu 1428 allows different importance options to be chosen. For instance, a message can be sent communicating that 4 soldiers need to be evacuated immediately at particular GPS coordinates. A time display 1430 is provided in the right hand corner of the screen display 1400. The screen display 1400 also includes an "OK" button 1432, "APPLY" button 1434 and a "CLOSE" button 1436, which allows a user to approve certain settings, to apply new settings and to close out of the screen 1400, respectively. It is to be appreciated that the information presented in FIGS. 11–14 is exemplary only, and that more or less information could be presented on the same or different screens in similar or different manners.

It is to be appreciated that the exemplary displays depicted in FIGS. 10–14 can be positioned at convenient locations so as to not interfere with stereoscopic vision, depth perception, other tasks to be performed with the hands, etc. For example, rather than being carried by hand or dangled in front of one of a user's eyes, the display can be positioned inside the left wrist (for right handers) and/or inside the right wrist (for left handers). Additionally, tactile entry means (e.g., a button pad) can be positioned at a suitable location on a user (e.g., on a lapel) to facilitate a more convenient mechanism for interfacing with and providing input (e.g., requested medical evacuation coordinates) into a unit without having to carry and hold the unit by hand. It is to be further appreciated that information displayed to a user can be configured based upon the intended use and application of the unit. By way of example, screen displays for light infantry soldiers may differ noticeably from screen displays for park rangers that perform search and rescue missions in remote, rugged terrain.

Figure 15:
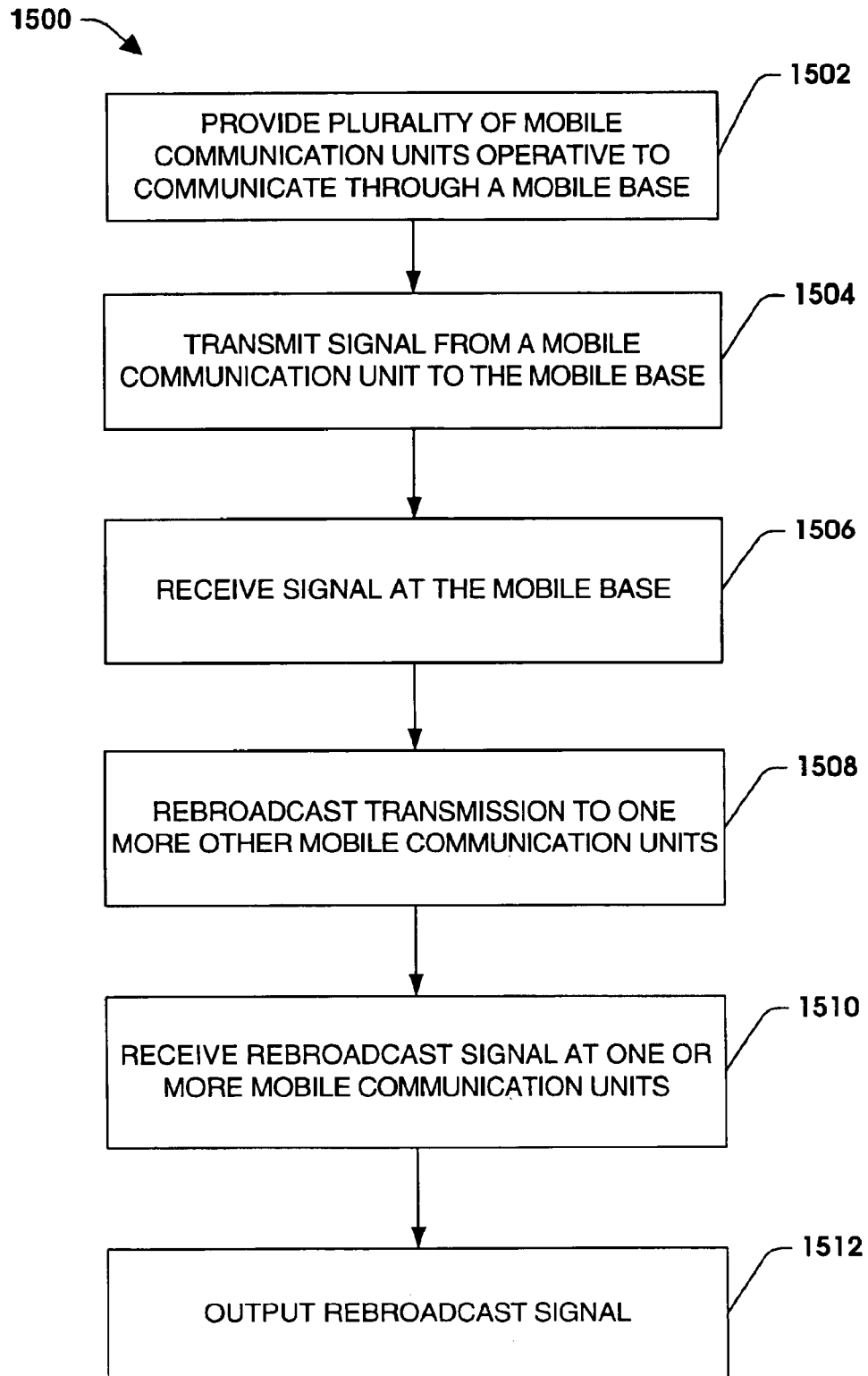
FIG. 15 illustrates a flow diagram for establishing and communicating within a mobile communication system using a mobile base repeater in accordance with one or more aspects of the present invention.
Figure 16:
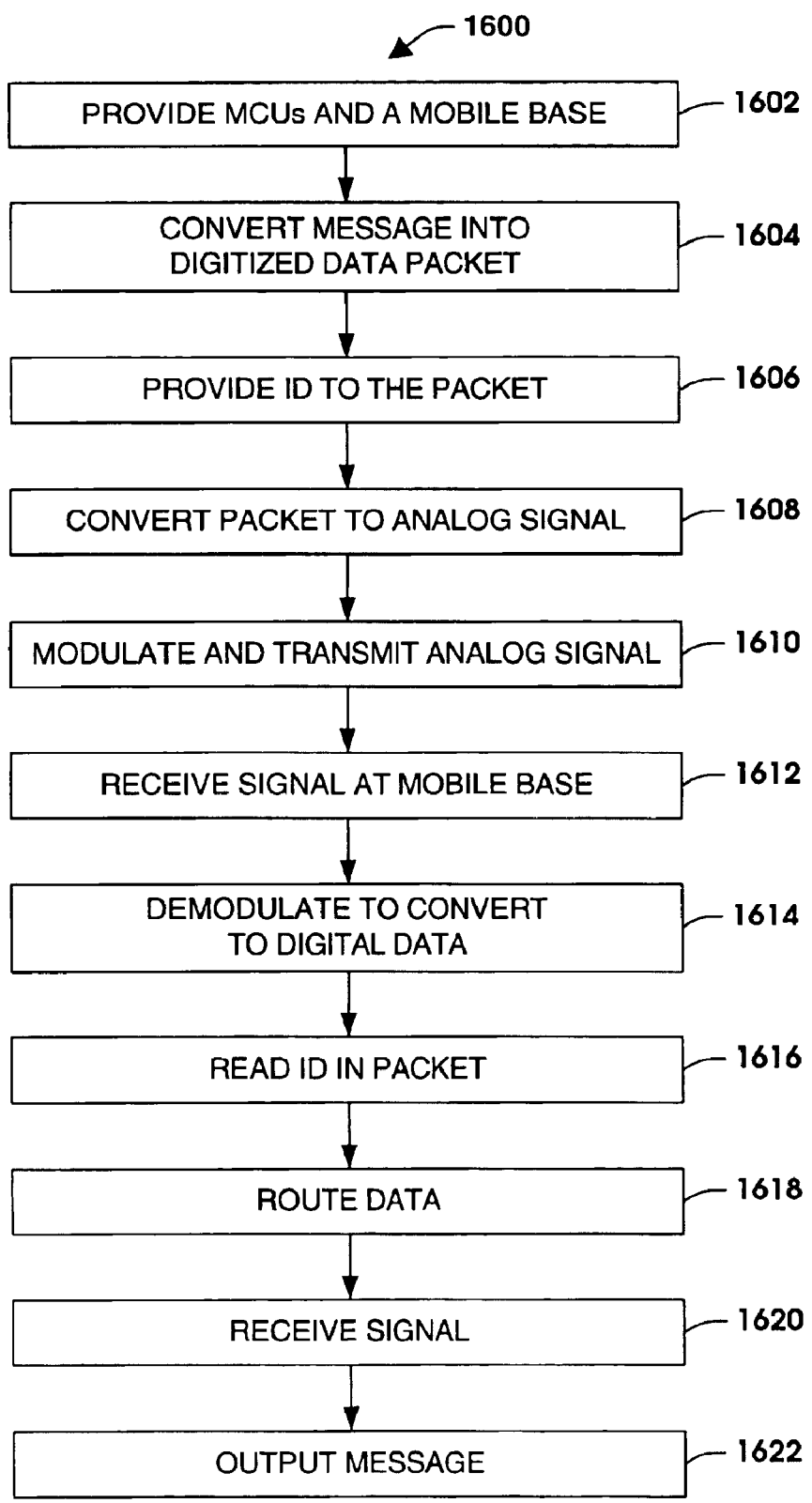
FIG. 16 illustrates a flow diagram for establishing and communicating within a mobile communication system using a mobile base router in accordance with one or more aspects of the present invention.
Figure 17:
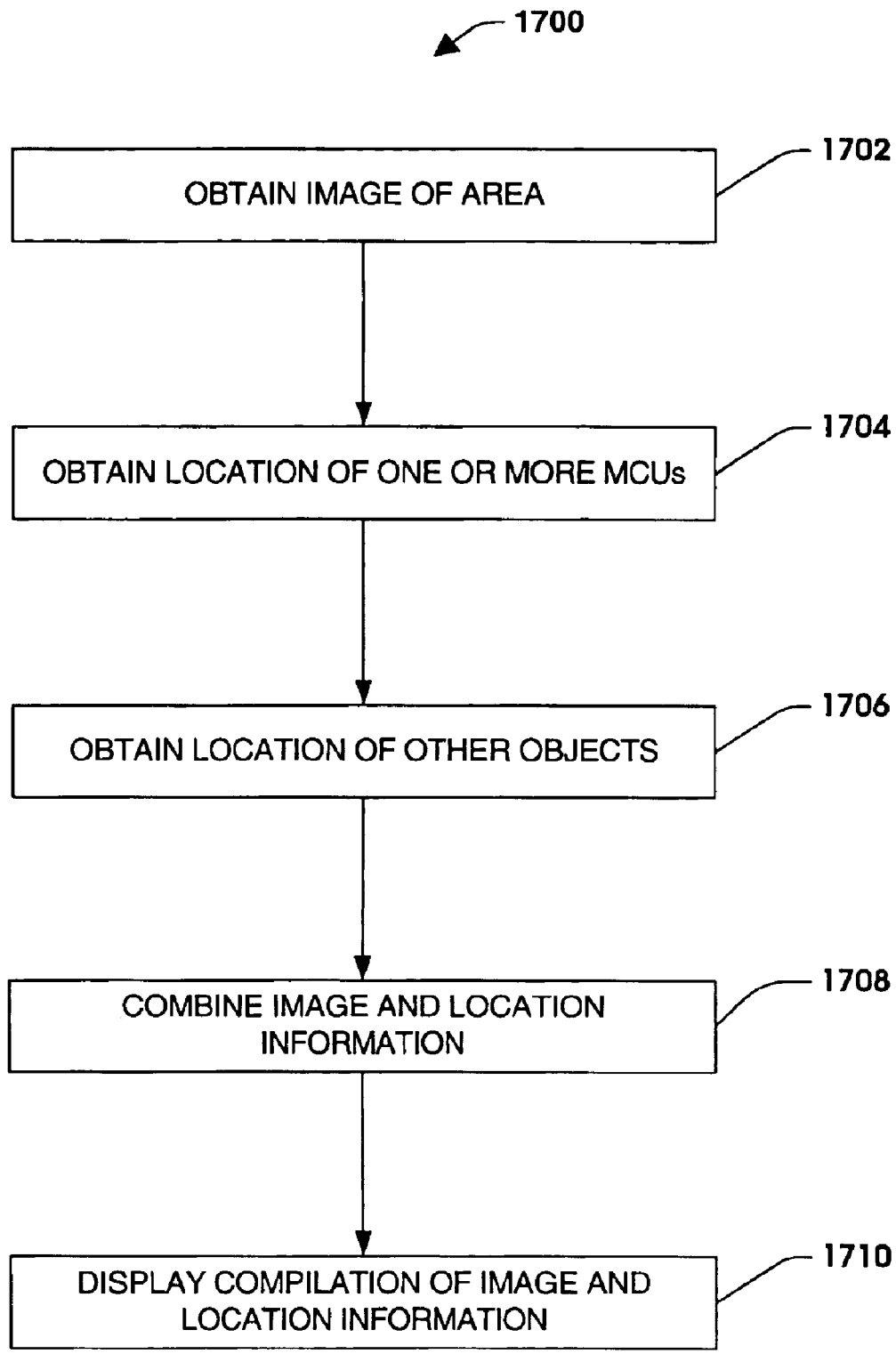
FIG. 17 illustrates a flow diagram for generating a display area in accordance with one or more aspects of the present invention.

In view of the foregoing structural and functional features described above, methodologies in accordance with various aspects of the present invention will be better appreciated with reference to FIGS. 15–17. While, for purposes of simplicity of explanation, the methodologies of FIGS. 15–17 are shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention.

FIG. 15 illustrates a methodology 1500 for establishing a mobile communication system that communicates within a mobile coverage area using a mobile base repeater in accordance with an aspect of the present invention. The mobile communication system mitigates line-of-sight constraints between a plurality of mobile communication units, such as a plurality of half-duplex two-way radio devices, without significantly increasing the size and/or weight of the MCUs. The methodology begins at 1502 wherein a plurality of MCUs operative to communicate through a mobile base station are provided to form a mobile communication system. The mobile base establishes a mobile communication coverage area for the MCUs. The mobile base may be included on an air vehicle residing at an elevation of about three miles above the MCUs.

Then, at 1504, a MCU transmits a signal to the mobile base. The signal may be a voice message provided into a microphone or a data message provided by an input device of a mobile communication unit. At, 1506, the signal is received by the mobile base and is re-broadcast to one or more other MCUs within the coverage area at 1508. The mobile base can re-broadcast the message at a power level substantially larger than the message was received, so as to increase the coverage area of the mobile communication system. At 1510, the re-broadcast signal is received at one or more MCUs, and is output to a user at 1512, such as by a speaker on the unit.

FIG. 16 illustrates a methodology 1600 for establishing a mobile communication system that communicates within a mobile coverage area using a mobile base router in accordance with an aspect of the present invention. The mobile communication system mitigates line-of-sight constraints between a plurality of mobile communication units, such as a plurality of half-duplex two-way radio devices, without significantly increasing the size and/or weight of the MCUs. The methodology begins at 1602 wherein a plurality of MCUs operative to communicate through a mobile base station are provided to form a mobile communication system. The mobile base establishes a mobile communication coverage area for the MCUs. The mobile base may, for example, be included on an air vehicle.

Then, at 1604, a message, such as a voice pattern is entered into a MCU that is converted into one or more digitized data packets. At 1606, identification information is provided to the one or more packets. The information can contain, for example, an identification code of the originating MCU and/or a code identifying the destination devices for the message. At 1608, the packet is converted to an analog signal, and at 1610 the analog signal is modulated for transmission over the air as modulated radio transmission waves or electromagnetic waves to the mobile base at an elevation of about three miles above the MCUs. At 1612, the signal is received by the mobile base, and at 1614 is demodulated to convert the analog signal to digital data. At 1616, the data packet is read by the router for identity information and routing information. Then, at 1618, the data is routed to the appropriate MCUs pursuant to the destination information. The signal is received at the appropriate destination MCUs at 1620, and output thereon at 1622.

FIG. 17 illustrates a methodology 1700 for generating a display area of a mobile communication system having a plurality of mobile communication units, such as a plurality of half-duplex two-way radio devices, and a mobile base station. The mobile base establishes a mobile communication coverage area for the mobile communication units. The mobile base may, for example, be included on an air vehicle. The methodology begins at 1702 wherein an image of at least a portion of the coverage area is obtained. The image may be a photo and/or video as obtained by a camera in a mobile base aboard an aeronautic vehicle, or a map from a command station capable of transmitting previously compiled data. At 1704, the location of one or more MCUs is obtained. This may include longitude, latitude and/or altitude information as obtained by GPS. Each MCU can transmit respective location information to the mobile base.

At 1706, the location (e.g., longitude, latitude and/or altitude) of other objects within the imaged area is obtained. These objects may include, for example, enemy troops, artillery, etc. in the context of a battle situation. Their location may be determined, for example, by satellite imaging and GPS technology and/or by determining their relative distances from the known locations of MCUs. This information can then also be transmitted to the mobile base by the MCUs. At 1708, image and location information is combined. The combined information may be presented on an MCU as a map of the area showing the relative locations of the items at 1710. To combine the information, it can be selectively routed from the mobile base to one or more of the MCUs for compilation thereon.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A wireless communication system comprising:
    a plurality of mobile communication units adapted to wirelessly transmit and receive communications;
    a mobile base that defines a mobile coverage area for the plurality of mobile communication units, the mobile base moving relative to the plurality of mobile communication units to maintain the mobile coverage area for at least a portion of the mobile communication units, the mobile base operative to receive transmissions from a mobile communication unit and re-broadcast the transmissions to at least one other mobile communication unit of the plurality of mobile communication units; and
    wherein at least one mobile communication unit of the plurality of communication units comprising a display operative to present a map of an area within which the at least one mobile communication unit is operating, the map being received from the mobile base and displayed at the at least one mobile communication unit, and the map comprising location information and geo-reference data.

2. The system of claim 1, the mobile base residing on an aeronautic vehicle capable of traveling at an elevation less than about seven kilometers above the mobile coverage area.

3. The system of claim 1, the mobile base comprising one of a repeater and a router.

4. The system of claim 1, at least one mobile communication unit of the plurality of mobile communication units being coupled to a button array, the button array having at least one button that invokes automatically at least one program residing on the at least one mobile communication unit when depressed.

5. The system of claim 4, the button array comprising a button that automatically invokes a program that transmits an alert condition and location information of the at least one mobile communication unit.

6. The system of claim 5, the transmission of the alert condition and location information being transmitted to a home base station through the mobile alert.

7. The system of claim 6, the at least one mobile communication unit being mountable to a wrist of a user and the button array comprising a lapel button pad.

8. The system of claim 1, the mobile base comprising a router capable of selectively routing transmissions to selected mobile communication units.

9. The system of claim 8, the router selectively routing transmissions to mobile communication units configured in different logical networks.

10. The system of claim 1, the at least one mobile communication unit comprising a global positioning system operative to transmit location information to the mobile base.

11. The system of claim 10, the mobile base comprising a camera that obtains an image of the coverage area, the mobile base adapted to transmit the image and location information to at least one communication unit.

12. The system of claim 11, the at least one mobile communication unit displays a map of the image coverage area combined with the location information of at least one mobile communication unit, the map including items within the coverage area.

13. The system of claim 12, the map of the image coverage area combined with the location information of at least one mobile communication unit being updated periodically.

14. The system of claim 1, the plurality of mobile communication units being half-duplex line-of-sight two-way radio devices each having a weight of about less than 10 pounds.

15. The system of claim 1, the at least one mobile communication unit comprising:
    a housing;
    an antenna internal to the housing to facilitate transmitting to and receiving transmissions from the mobile base traveling at an elevation less than about seven kilometers above the plurality of communication units; and
    a global positioning system adapted to provide location information of the at least one mobile communication unit to the mobile base, the location information comprising at least one of longitude, latitude and elevation information.

16. A mobile base situated aboard an aeronautic vehicle capable of traveling at an elevation of less than about seven kilometers above a plurality of mobile communication units, the mobile base comprising:
    a receiver operative to receive a transmission message from at least one of a plurality of mobile communication units and convert the message to digitized data;
    a router operable to extract routing information from the digitized data to determine at least one destination mobile communication unit to receive the message;
    a transmitter that retransmits the message to the at least one destination mobile communication unit based on the extracted routing information; and a camera adapted to obtain an image of an area within a coverage range of the mobile base, the mobile base adapted to transmit the image to at least one of the plurality of mobile communication units.

17. The mobile base of claim 16, the mobile base operative to receive location information from at least one mobile communication unit and integrate the location information into the image of the area to create a map with the location information of the at least one mobile communication unit displayed thereon, the mobile base adapted to transmit the map to a plurality of mobile communication units concurrently.

18. A method for establishing a mobile communication system, the method comprising:
   providing a plurality of mobile communication units;
   providing a mobile base that defines a coverage area for the mobile communication system;
   moving the mobile base to maintain the coverage area with at least some of the plurality of mobile communication units;
   transmitting a signal to the mobile base from a mobile communication unit;
   receiving the signal at the mobile base;
   re-broadcasting the signal from the mobile base to at least one of the plurality of mobile communication units;
   obtaining an image of at least a portion of the coverage area;
   obtaining location information on at least one of the plurality of mobile communication units;
   combining the location information with the image to form a map containing the location of the at least one of the plurality of mobile communication units; and
   transmitting the map to the at least one of the plurality mobile communication units.

19. The method of claim 18, the mobile base residing on an aeronautic vehicle capable of traveling at an elevation less than about seven kilometers above the plurality of mobile communication units.

20. The method of claim 18, further comprising converting the received signal into digitized data, extracting routing information from the digitized packet and routing the signal to at least one destination mobile communication unit based on the extracted routing information.

21. The method of claim 18, further comprising continuously updating the image and location information of the plurality of mobile communication units and providing the updated information to the plurality of mobile communication units periodically.

22. The method of claim 18, further comprising providing a schedule rendezvous time and coordinates associated with a scheduled rendezvous location to at least one mobile communication unit, the mobile communication unit displaying a count down time remaining until the scheduled rendezvous time.

23. A wireless communication system comprising:
   a mobile base that defines a mobile coverage area for a plurality of mobile communication units, the mobile base moving relative to the plurality of mobile communication units to maintain the mobile coverage area for at least a portion of the plurality of mobile communication units, the mobile base operative to receive transmissions from at least one mobile communication unit and re-broadcast the transmissions to at least one other mobile communication unit of the plurality of mobile communication units, and the mobile base comprising a camera that obtains an image of the coverage area of the mobile base, the mobile base adapted to transmit a map associated with the coverage area to at least one mobile communication unit for display at the at least one mobile communication unit.

24. The system of claim 23, the mobile base residing on an aeronautic vehicle capable of traveling at an elevation less than about seven kilometers above the mobile coverage area.

25. The system of claim 23, the mobile base further comprising a synthetic aperture radar.

26. The system of claim 23, the mobile base further comprising a hyperspectral camera.

27. The system of claim 23, the mobile base further comprising a chemical detector.

28. A mobile communication unit, comprising;
   a wireless transmitter that transmits communications to a mobile base that re-broadcasts the communications to at least one additional mobile communication unit; a wireless receiver that receives communications from the at least one additional mobile communication unit re-broadcasted from the mobile base; and a display operative to present a map of an area within which the mobile communication unit is operating, the map being received from a camera residing on the mobile base that is suitably adapted to obtain an image of a coverage area associated with the mobile base, wherein the mobile base moves relative to at least one mobile communication unit to maintain the coverage area for a plurality of mobile communication units.

29. The mobile communication unit of claim 28, the mobile communication unit being coupled to a button array, the button array having at least one button that invokes automatically at least one program residing on the mobile communication unit when depressed.

30. The mobile communication unit of claim 29, the button array comprising a button that automatically invokes a program that transmits an alert condition and location information of the mobile communication unit.

31. The mobile communication unit of claim 28, the mobile communication unit further comprising a global positioning system operative to transmit location information associated with the mobile communication unit to the mobile base, the location information comprising at least one of longitude latitude, and elevation information.

32. The mobile communication unit of claim 28, further comprising:
   an antenna internal to the housing to facilitate transmitting to and receiving transmissions from the mobile base traveling at an elevation less than about seven kilometers above the communication unit.

* * * * *